(12) United States Patent
Yamamoto et al.

(10) Patent No.: US 11,361,538 B2
(45) Date of Patent: Jun. 14, 2022

(54) POULTRY RAISING SYSTEM, POULTRY RAISING METHOD, AND RECORDING MEDIUM

(71) Applicant: PANASONIC INTELLECTUAL PROPERTY MANAGEMENT CO., LTD., Osaka (JP)

(72) Inventors: Yasuko Yamamoto, Osaka (JP); Satoshi Sugino, Osaka (JP); Yoshikazu Tashiro, Aichi (JP); Kunihiko Minoshima, Gifu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 89 days.

(21) Appl. No.: 16/964,418

(22) PCT Filed: Jan. 10, 2019

(86) PCT No.: PCT/JP2019/000539
§ 371 (c)(1),
(2) Date: Jul. 23, 2020

(87) PCT Pub. No.: WO2019/146416
PCT Pub. Date: Aug. 1, 2019

(65) Prior Publication Data
US 2021/0049343 A1   Feb. 18, 2021

(30) Foreign Application Priority Data
Jan. 26, 2018   (JP) .............................. JP2018-011999

(51) Int. Cl.
G06K 9/00       (2022.01)
G06V 20/13      (2022.01)
(Continued)

(52) U.S. Cl.
CPC ............ G06V 20/13 (2022.01); A01K 29/005 (2013.01); A01K 45/00 (2013.01); G06T 7/11 (2017.01);
(Continued)

(58) Field of Classification Search
CPC .... A01K 45/005; A01K 29/005; A01K 45/00; A01K 31/22; A01K 39/01; A01K 39/02;
(Continued)

(56) References Cited

U.S. PATENT DOCUMENTS

2013/0064432 A1\* 3/2013 Banhazi ................... G06T 7/12
                                                     382/110
2016/0050888 A1\* 2/2016 Berckmans .......... A01K 29/005
                                                     119/51.02

FOREIGN PATENT DOCUMENTS

JP    H09-245276 A    9/1997
JP    2006-050989 A   2/2006
(Continued)

OTHER PUBLICATIONS

International Search Report and Written Opinion dated Apr. 16, 2019 in International Application No. PCT/JP2019/000539; with partial English translation.

*Primary Examiner* — Alex Kok S Liew
(74) *Attorney, Agent, or Firm* — McDermott Will & Emery LLP (57) ABSTRACT

A poultry raising system includes: an imaging unit configured to capture an image of an inside of a poultry house; and a monitoring unit configured to determine a variation in density of chickens present in a particular region in the image captured by the imaging unit, and monitor the variation determined. The particular region is at least part of the image.

15 Claims, 11 Drawing Sheets

(51) Int. Cl.
  *G06T 7/62*    (2017.01)
  *G06T 7/11*    (2017.01)
  *A01K 29/00*   (2006.01)
  *A01K 45/00*   (2006.01)
  *G08B 21/18*   (2006.01)
  *G06V 10/25*   (2022.01)
(52) U.S. Cl.
  CPC ............ *G06T 7/62* (2017.01); *G06V 10/25* (2022.01); *G08B 21/182* (2013.01); *G06T 2207/20021* (2013.01)
(58) Field of Classification Search
  CPC ........ A01K 5/02; A01K 31/002; G01K 11/12; G01K 1/02; G06K 9/00624; G06K 9/0063; G06K 9/3233; G06K 9/00362; G06K 9/6212; G06K 9/6226; G06K 9/6277
  See application file for complete search history.

(56) References Cited

FOREIGN PATENT DOCUMENTS

| | | |
|---|---|---|
| JP | 2008-000072 A | 1/2008 |
| JP | 2016-202184 A | 12/2016 |
| JP | 2017-192316 A | 10/2017 |

\* cited by examiner

POULTRY RAISING SYSTEM, POULTRY RAISING METHOD, AND RECORDING MEDIUM

CROSS-REFERENCE OF RELATED APPLICATIONS

This application is the U.S. National Phase under 35 U.S.C. § 371 of International Patent Application No. PCT/JP2019/000539, filed on Jan. 10, 2019, which in turn claims the benefit of Japanese Application No. 2018-011999, filed on Jan. 26, 2018, the entire disclosures of which Applications are incorporated by reference herein.

TECHNICAL FIELD

A present invention relates to a poultry raising system used in a poultry house etc.

BACKGROUND ART

Poultry raising is a popular industry in many countries of the world including Japan. As a technique related to poultry raising, Patent Literature (PTL) 1 discloses the automatic mortality rate determination method which automatically determines the mortality rate of chickens from an image captured by a thermograph.

CITATION LIST

Patent Literature

PTL 1: Japanese Unexamined Patent Application Publication No. 2006-50989

SUMMARY OF THE INVENTION

Technical Problem

In raising chickens for meat production, an effective way of increasing the body weight of the chickens has been sought. For example, if the crowding state of chickens around a feeder in a poultry house can be monitored, it is possible to improve the state of feed consumed by the chickens and to facilitate the increase in the body weight of the chickens by modifying the environment around the feeder when the number of the chickens around the feeder is small.

The present invention provides a poultry raising system, a poultry raising method, and a non-transitory computer-readable recording medium which are capable of monitoring the crowding state of chickens in a poultry house.

Solutions to Problem

A poultry raising system according to an aspect of the present invention includes: an imaging unit configured to capture an image of an inside of a poultry house; and a monitoring unit configured to determine a variation in density of chickens present in a particular region in the image captured by the imaging unit, and monitor the variation determined, the particular region being at least part of the image.

A poultry raising method according to an aspect of the present invention includes: capturing an image of an inside of a poultry house; determining a variation in density of chickens present in a particular region in the image captured, the particular region being at least part of the image; and monitoring the variation determined.

A recording medium according to an aspect of the present invention is a non-transitory computer-readable recording medium for use in a computer, the recording medium having a computer program recorded thereon for causing the computer to execute the poultry raising method.

Advantageous Effect of Invention

A poultry raising system, a poultry raising method, and a recording medium according to the present invention are capable of monitoring the crowding state of chickens in a poultry house.

DESCRIPTION OF EXEMPLARY EMBODIMENTS

Hereinafter, embodiments will be described with reference to the drawings. Note that the embodiments below each describe a general or specific example. The numerical values, shapes, materials, structural elements, the arrangement and connection of the structural elements, steps, and the order of the steps, etc. described in the following embodiments are mere examples, and thus are not intended to limit the present invention. Furthermore, among the structural elements in the following embodiments, those not recited in any of the independent claims representing the most generic concepts are described as optional structural elements.

Note that the drawings are schematic diagrams, and do not necessarily provide strictly accurate illustration. Throughout the drawings, the same numeral is given to substantially the same element, and redundant description is omitted or simplified.

Embodiment

[Configuration]

Figure 1:
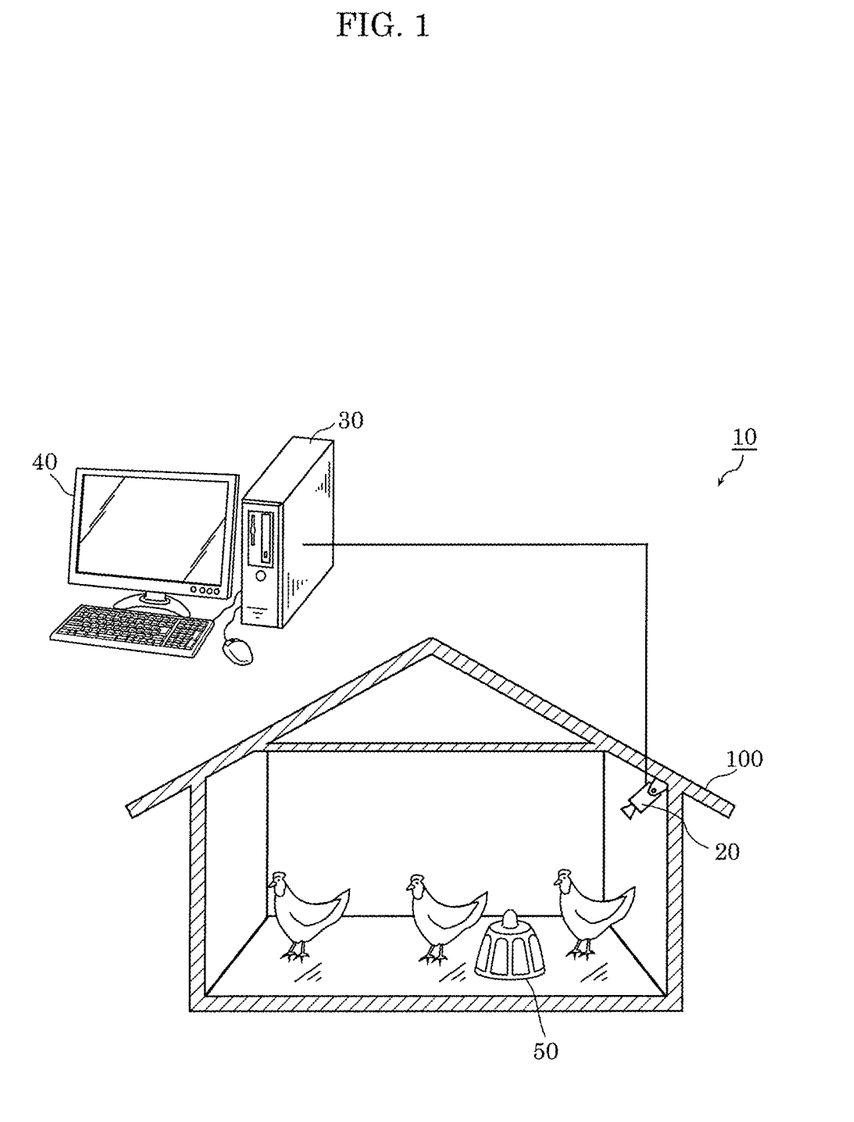
FIG. 1 is a diagram schematically illustrating a poultry raising system according to an embodiment.
Figure 2:
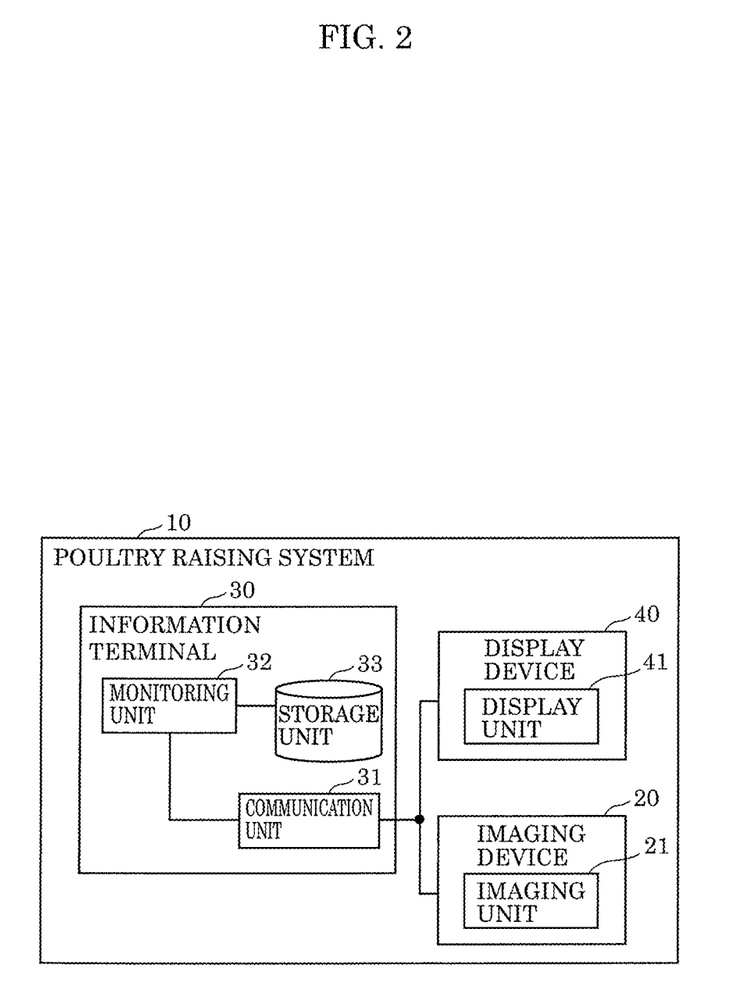
FIG. 2 is a block diagram illustrating a function configuration of the poultry raising system according to the embodiment.

First, the configuration of a poultry raising system according to an embodiment will be described. FIG. 1 is a diagram schematically illustrating a poultry raising system according to an embodiment. FIG. 2 is a block diagram illustrating a function configuration of the poultry raising system according to the embodiment.

As illustrated in FIG. 1, poultry raising system 10 according to the embodiment is provided in, for example, poultry house 100. Chickens raised in poultry house 100 are broiler chickens (more specifically, Chunky, Cobb, Arbor Acres, etc.), but may be other breeds of chickens, such as the so-called locally produced chickens. Poultry house 100 includes feeder 50, a waterer (not illustrated), etc.

Poultry raising system 10 monitors the state of feed consumed by the chickens in poultry house 100 by processing an image of the inside of poultry house 100. The image is captured by imaging device 20. When it is determined that the state of feed consumed by the chickens has worsened, an image indicating that the feed consumption state has worsened is displayed on display device 40. That is, a manager of poultry house 100 is notified, via display device 40, that the feed consumption state has worsened. Accordingly, the manager of poultry house 100 can efficiently increase the body weight of the chickens by improving the feed consumption state.

Specifically, poultry raising system 10 includes imaging device 20, information terminal 30, and display device 40 as illustrated in FIG. 1 and FIG. 2. Hereinafter, each of the devices will be described in detail.

[Imaging Device]

Imaging device 20 captures an image of an inside of poultry house 100. Imaging device 20 is, for example, provided on a ceiling of poultry house 100. Imaging unit 21 captures an image which overlooks the inside of poultry house 100. The image here means a still image. Imaging device 20 constantly captures a dynamic image which includes, for example, a plurality of images (in other words, frames). Imaging device 20 includes imaging unit 21.

Imaging unit 21 is an imaging module which includes an image sensor and an optical system (a lens, etc.) which guides light to the image sensor. Specifically, the image sensor is a complementary metal oxide semiconductor (CMOS) sensor, a charge coupled device (CCD) sensor, etc. An image captured by imaging unit 21 is processed by information terminal 30 to monitor the state of feed consumed by chickens in poultry house 100.

[Information Terminal]

Information terminal 30 is an information terminal used by, for example, a manager of poultry house 100. Information terminal 30 monitors the state of feed consumed by chickens in poultry house 100 by processing an image of the inside of poultry house 100. The image is captured by imaging device 20. Information terminal 30 is, for example, a personal computer, but may be a smartphone or a tablet terminal. In addition, information terminal 30 may be a device exclusively used for poultry raising system 10. Specifically, information terminal 30 includes communication unit 31, monitoring unit 32, and storage unit 33.

Communication unit 31 is an example of an obtaining unit. Communication unit 31 obtains an image captured by imaging unit 21 included in imaging device 20. In addition, based on the control of monitoring unit 32, communication unit 31 transmits, to display device 40, image information for displaying an image indicating that the feed consumption state has worsened.

Specifically, communication unit 31 is a communication module which performs wired or wireless communication. The communication module is, in other words, a communication circuit. The communication method which communication unit 31 employs is not particularly limited. Communication unit 31 may include two types of communication modules for communicating with each of imaging device 20 and display device 40. In addition, a relay device, such as a router, may be interposed between communication unit 31, and imaging device 20 and display device 40.

Monitoring unit 32 is an information processing unit which processes an image obtained by communication unit 31 for monitoring the state of feed consumed by chickens in poultry house 100. Specifically, monitoring unit 32 monitors the state of feed consumed by the chickens in poultry house 100 by regularly or periodically performing at least one of a first monitoring operation and a second monitoring operation. The first monitoring operation and the second monitoring operation will be described later.

Specifically, monitoring unit 32 is realized by a microcomputer, but monitoring unit 32 may be realized by a processor or a dedicated circuit. Monitoring unit 32 may be realized by combining two or more of the following devices: a microcomputer, a processor, and a dedicated circuit. Note that the details of image processing performed by monitoring unit 32 and the determination of the feed consumption state will be described later.

Storage unit 33 stores a control program which is executed by monitoring unit 32. In addition, storage unit 33 stores, for example, a threshold which is used for the determination of the feed consumption state. Storage unit 33 is realized by, for example, a semiconductor memory.

[Display Device]

Display device 40 notifies, by displaying an image, a manager etc. of poultry house 100 of the state of feed consumed by chickens in poultry house 100. Display device 40 includes display unit 41. Display unit 41 displays an image based on image information transmitted from communication unit 31. Display unit 41 is an example of a notifying unit, and notifies, by displaying the image, a manager etc. of poultry house 100 that the feed consumption state has worsened.

Specifically, display device 40 is, for example, a monitor for a personal computer, but display device 40 may be a smartphone or a tablet terminal. When information terminal 30 is a smartphone etc., information terminal 30 may include display unit 41, instead of display device 40 including display unit 41. Specifically, display unit 41 is realized by a liquid crystal panel or an organic electroluminescent (EL) panel.

Note that it is not essential to notify, via an image, a manager etc. of poultry house 100 that the feed consumption state has worsened. A manager etc. of poultry house 100 can be notified, using a sound etc., that the feed consumption state has worsened. In this case, poultry raising system 10 is to include, instead of display unit 41, a sound outputting unit, such as a speaker, as a notifying unit.

[First Monitoring Operation]

It is considered that the feed consumption state is favorable when chickens are crowding around feeder 50 in poultry house 100. Accordingly, poultry raising system 10 monitors the crowding state of chickens around feeder 50.

Figure 3:
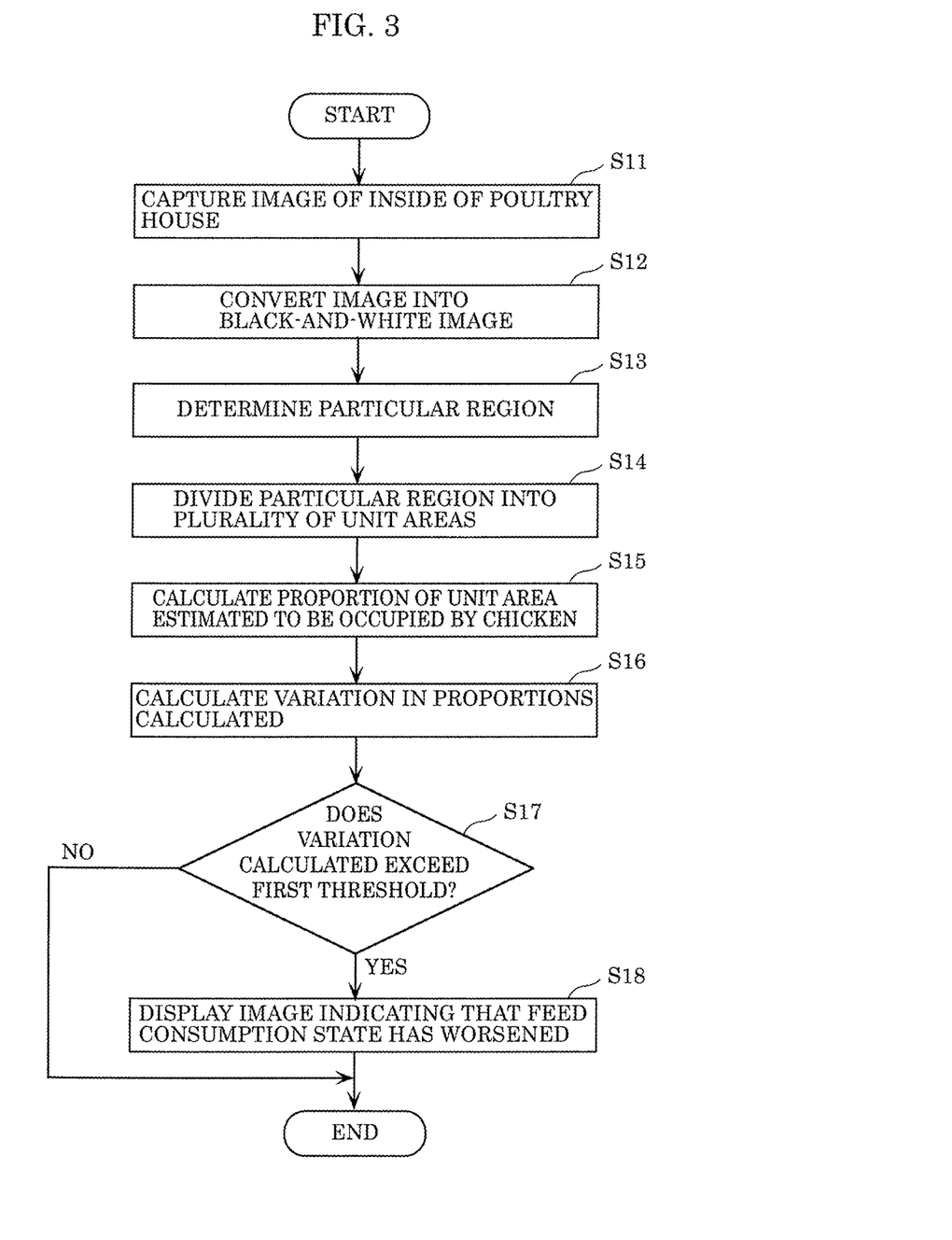
FIG. 3 is a flowchart illustrating a first monitoring operation.

Hereinafter, such a first monitoring operation will be described in detail. FIG. 3 is a flowchart illustrating a first monitoring operation.

Figure 4A:
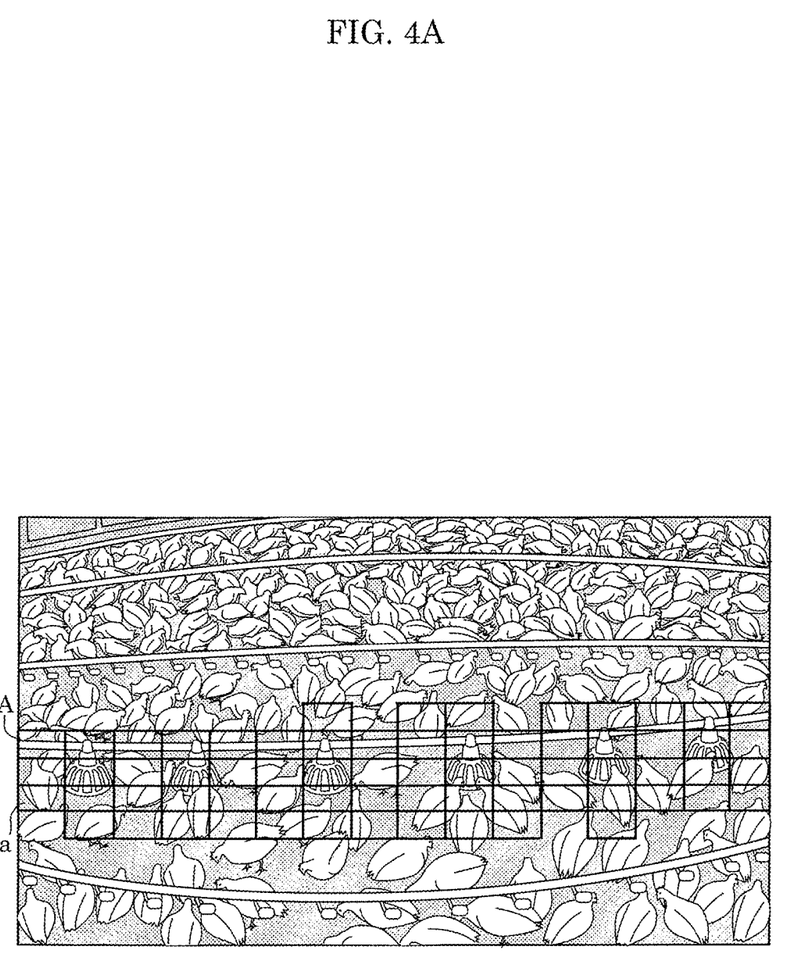
FIG. 4A is a diagram illustrating an example of an image of an inside of the poultry house which is captured by an imaging unit.

First, imaging unit 21 of imaging device 20 captures an image of the inside of poultry house 100 (S11). FIG. 4A is a diagram illustrating an example of an image of the inside of poultry house 100 which is captured by imaging unit 21.

Next, monitoring unit 32 of information terminal 30 obtains the image of the inside of poultry house 100 which is captured by imaging unit 21, and converts the image obtained into a black-and-white image (S12). When the image captured by imaging unit 21 is a color image, monitoring unit 32 converts the color image obtained into a grayscale image. The grayscale image is converted into a binary image by comparing a pixel value of each of a plurality of pixels included in the gray scale image with a threshold. That is, monitoring unit 32 converts the grayscale image into a black-and-white image. The black-and-white image is an image having a plurality of pixels each of which is either black or white. The black-and-white image is, in other words, an image which is captured by imaging unit 21 and is converted into a binary image.

Since chickens have a white body, a portion that is white in the black-and-white image is a portion in which at least a chicken is estimated to be present. Since determination of the crowding state of chickens around feeder 50 is the aim of the first monitoring operation, the accuracy of the determination of the crowding state can be improved by distinguishing a portion in which at least a chicken is present and the other portions. Consequently, a threshold used for converting an image into a binary image is set as appropriate so that the portion in which the at least a chicken is present is to be selectively determined as white. In addition, feeder 50 etc. which are placed inside of poultry house 100 may have coloration which is more likely to be black when the image is converted into a binary image. That is, feeder 50 may have coloration different from the chickens.

Figure 4B:
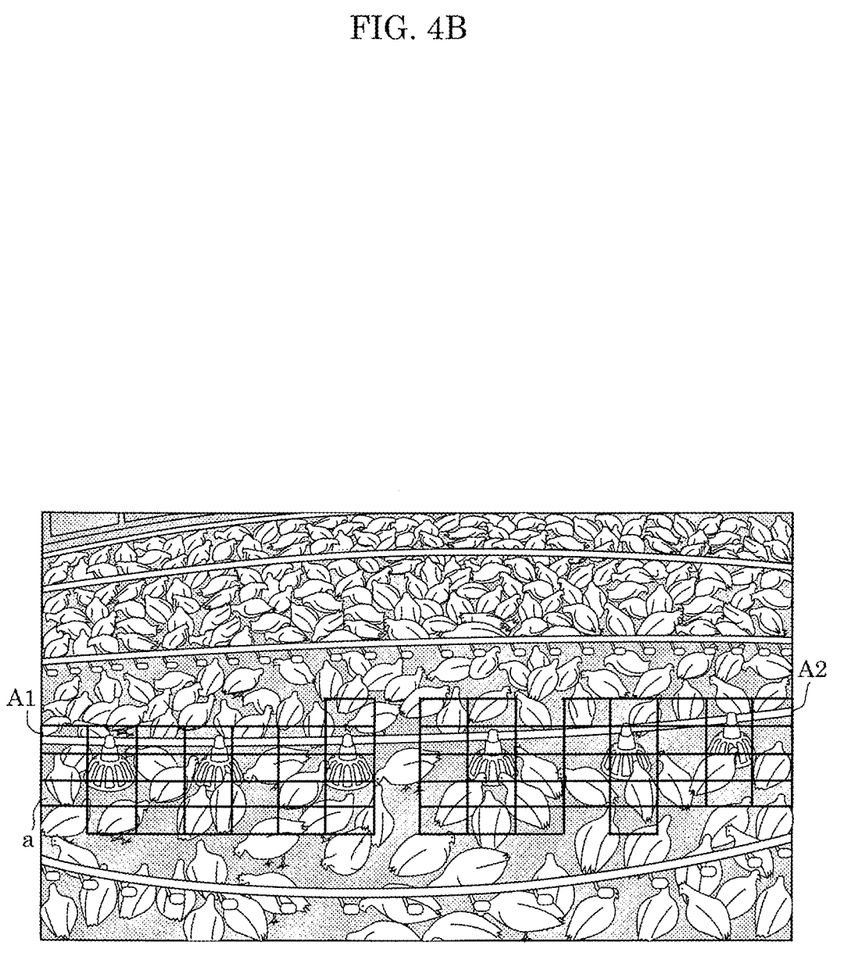
FIG. 4B is a diagram illustrating another example of an image of the inside of the poultry house which is captured by the imaging unit.

Next, monitoring unit 32 determines a particular region which is at least part of the black-and-white image (S13). The particular region is, specifically, part of the black-and-white image, and includes a portion in which feeder 50 is present. FIG. 4A exemplifies particular region A which is around feeder 50 and extends along the horizontal direction of an image. In FIG. 4A, a region around feeder 50 is determined to be particular region A. Note that a particular region may be divided into a plurality of particular regions. FIG. 4B is a diagram illustrating an example of an image of the inside of poultry house 100 which is captured by imaging unit 21 in the case in which a particular region is divided into a plurality of particular regions. FIG. 4B illustrates particular region A2 in addition to particular region A1. Determination as to which portion of an image is to be a particular region is empirically or experimentally made by, for example, an installer at the time of installing imaging device 20. When an area of an image captured by imaging unit 21 is small, the entirety of the image may be a particular region.

Next, monitoring unit 32 divides a particular region into a plurality of unit areas (S14). FIG. 4A (or FIG. 4B) exemplifies unit areas each having the shape of a quadrilateral which is obtained by dividing the particular region into a grid-shaped pattern. Determination of a method of dividing the particular region (the size of a unit area, the number of dividing a particular region, etc.) is empirically or experimentally made by, for example, the installer etc.

Next, monitoring unit 32 calculates, for each of the plurality of unit areas, the proportion of the unit area estimated to be occupied by at least a chicken (S15).

Specifically, monitoring unit 32 calculates the proportion of the area of the unit area that is occupied by white color to the total area of the unit area as the proportion of the unit area that is estimated to be occupied by at least a chicken. More specifically, monitoring unit 32 calculates the proportion of the area of the unit area that is white by dividing the total number of white pixels included in the unit area by the total number of pixels included in the unit area.

Next, monitoring unit 32 calculates, for each of the unit areas, a variation in the proportions of the unit area in which at least a chicken is estimated to be present (S16). In other words, monitoring unit 32 determines a spatial variation in the density of chickens present in the particular region. The variation here is specifically a standard deviation, but may be a variance. Hereinafter, the variation in the proportions of the unit areas each of which has been calculated and in each of which at least a chicken is estimated to be present will also be indicated as a density deviation.

A state in which the density deviation is comparatively small means that the feed consumption state is favorable. According to experiments conducted by the inventors, the body weight of chickens can be efficiently increased by maintaining the state in which the density deviation is comparatively small. Accordingly, monitoring unit 32 determines whether the density deviation (that is, the variation calculated in step S16) exceeds a first threshold (S17).

Figure 5:
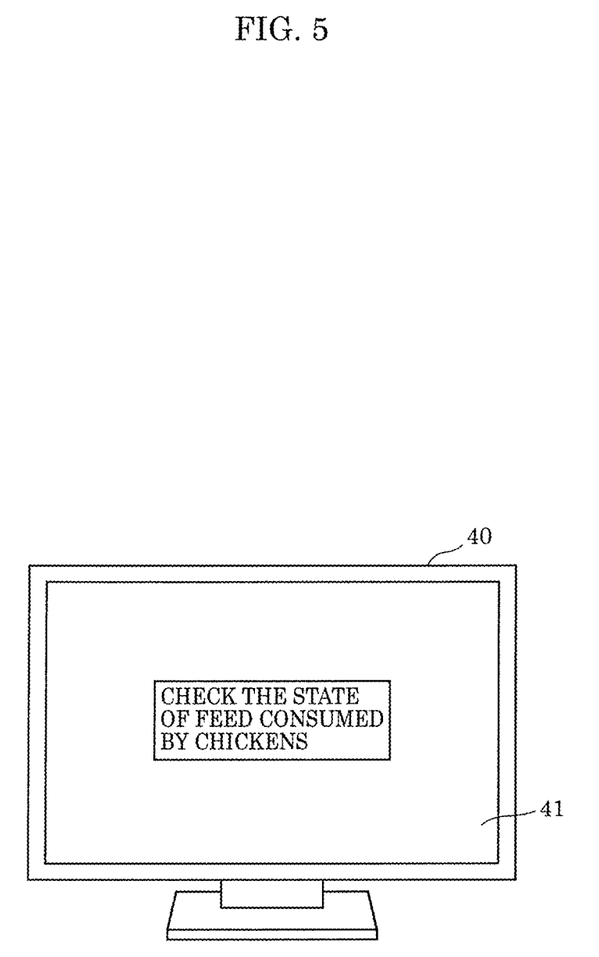
FIG. 5 is a diagram illustrating an example of an image indicating that a feed consumption state has worsened.

When the density deviation exceeds the first threshold (YES in S17), or in other words, when it is estimated that the state of feed consumed by chickens are unfavorable, monitoring unit 32 causes communication unit 31 to transmit image information for displaying an image indicating that the feed consumption state has worsened. Display device 40 receives the image information, and display unit 41 displays, based on the image information received, the image indicating that the feed consumption state has worsened (S18). FIG. 5 is a diagram illustrating an example of an image indicating that the feed consumption state has worsened. In other words, display unit 41 provides a notification indicating that the feed consumption state has worsened by displaying an image as shown in FIG. 5 when the variation monitored by monitoring unit 32 exceeds the first threshold.

On the contrary, when the density deviation is at most the first threshold (NO in S17), or in other words, when the state of feed consumed by chickens are estimated to be favorable, the image indicating that the feed consumption state has worsened will not be displayed. In this case, display unit 41 may display an image indicating that the feed consumption state is favorable.

More specifically, the image indicating that the feed consumption state has worsened is displayed by display unit 41 when a state in which the density deviation exceeds the first threshold lasts for at least a certain period of time. That is, the image is displayed when the density deviation does not return below the first threshold for more than the certain period of time. The first threshold is empirically or experimentally determined by the installer etc. in an appropriate manner. The first threshold need not be a fixed threshold. The first threshold may vary according to, for example, the ages in days of the chickens.

Such aforementioned first monitoring operation can monitor the crowding state of chickens around feeder 50 inside of poultry house 100, and can provide a notification when the crowding state of chickens around feeder 50 decreases.

[Second Monitoring Operation]

Figure 6:
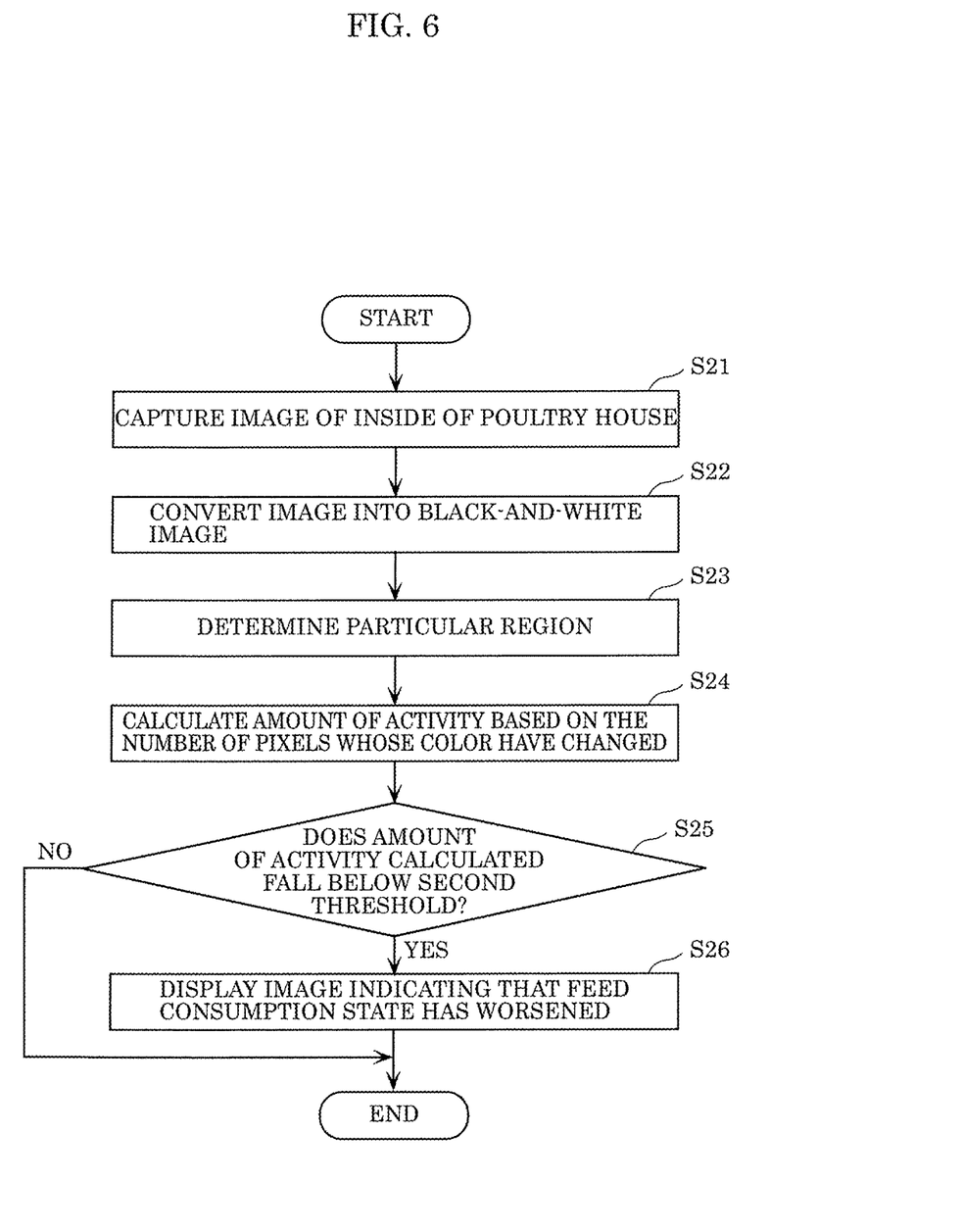
FIG. 6 is a flowchart illustrating a second monitoring operation.

Furthermore, chickens which are active around feeder 50 are not only present around feeder 50, but are estimated to be consuming feed. Consequently, it is considered that the feed consumption state is more favorable as the amount of activity of the chickens around feeder 50 increases. Accordingly, poultry raising system 10 may monitor the amount of activity of chickens around feeder 50. Specifically, monitoring unit 32 may calculate the amount of activity of chickens in a particular region by processing an image captured by imaging unit 21, and monitor the amount of activity calculated. Hereinafter, such a second monitoring operation will be described in detail. FIG. 6 is a flowchart illustrating the second monitoring operation.

First, imaging unit 21 of imaging device 20 captures an image of the inside of poultry house 100 (S21). Monitoring unit 32 of information terminal 30 converts the image of the inside of poultry house 100 which is captured by imaging unit 21 into a black-and-white image (S22), and determines at least part of the black-and-white image as a particular region (S23). These steps S21 through S23 are the same as steps S11 through S13 in FIG. 3.

Next, monitoring unit 32 calculates the amount of activity based on the number of pixels which are included in a particular region of the black-and-white image to be processed and whose color have changed from an image one frame prior (S24). Specifically, monitoring unit 32 compares the black-and-white image to be processed with a black-and-white image one frame prior, and counts the number of pixels which are included in the particular region and whose color have changed from the black-and-white image one frame prior. Here, the pixels whose color have changed includes both pixels whose color have changed from black to white and pixels whose color have changed from white to black. Then, monitoring unit 32 calculates the number of pixels counted as the amount of activity. Note that monitoring unit 32 may calculate the proportion of the number of pixels counted to the total number of pixels included in the particular region as the amount of activity.

Next, monitoring unit 32 determines whether the amount of activity calculated falls below a second threshold (S25). When the amount of activity falls below the second threshold (YES in S25), or in other words, when it is estimated that the state of feed consumed by chickens are unfavorable, monitoring unit 32 causes communication unit 31 to transmit image information for displaying an image indicating that the feed consumption state has worsened. Display device 40 receives the image information, and display unit 41 displays, based on the image information received, the image indicating that the feed consumption state has worsened (S26). In other words, display unit 41 provides a notification indicating that the feed consumption state has worsened by displaying an image as shown in FIG. 5 when the amount of activity monitored by monitoring unit 32 falls below the second threshold.

On the contrary, when the amount of activity is at least the second threshold (NO in S25), or in other words, when the state of feed consumed by the chickens are estimated to be favorable, the image indicating that the feed consumption state has worsened will not be displayed. In this case, display unit 41 may display an image indicating that the feed consumption state is favorable.

More specifically, the image indicating that the feed consumption state has worsened is displayed by display unit 41 when a state in which the amount of activity falls below the second threshold lasts for at least a certain period of time. That is, the image is displayed when the amount of activity does not return above the second threshold for more than the certain period of time. The second threshold is empirically or experimentally determined by the installer etc. in an appropriate manner. The second threshold need not be a fixed threshold. The second threshold may vary according to, for example, the ages in days of the chickens.

Such aforementioned second monitoring operation can monitor the amount of activity of chickens around feeder 50 inside of poultry house 100, and can notify, for example, a manager of poultry house 100 when the amount of activity of the chickens around feeder 50 decreases.

[Conclusion on Feed Consumption State]

Figure 7:
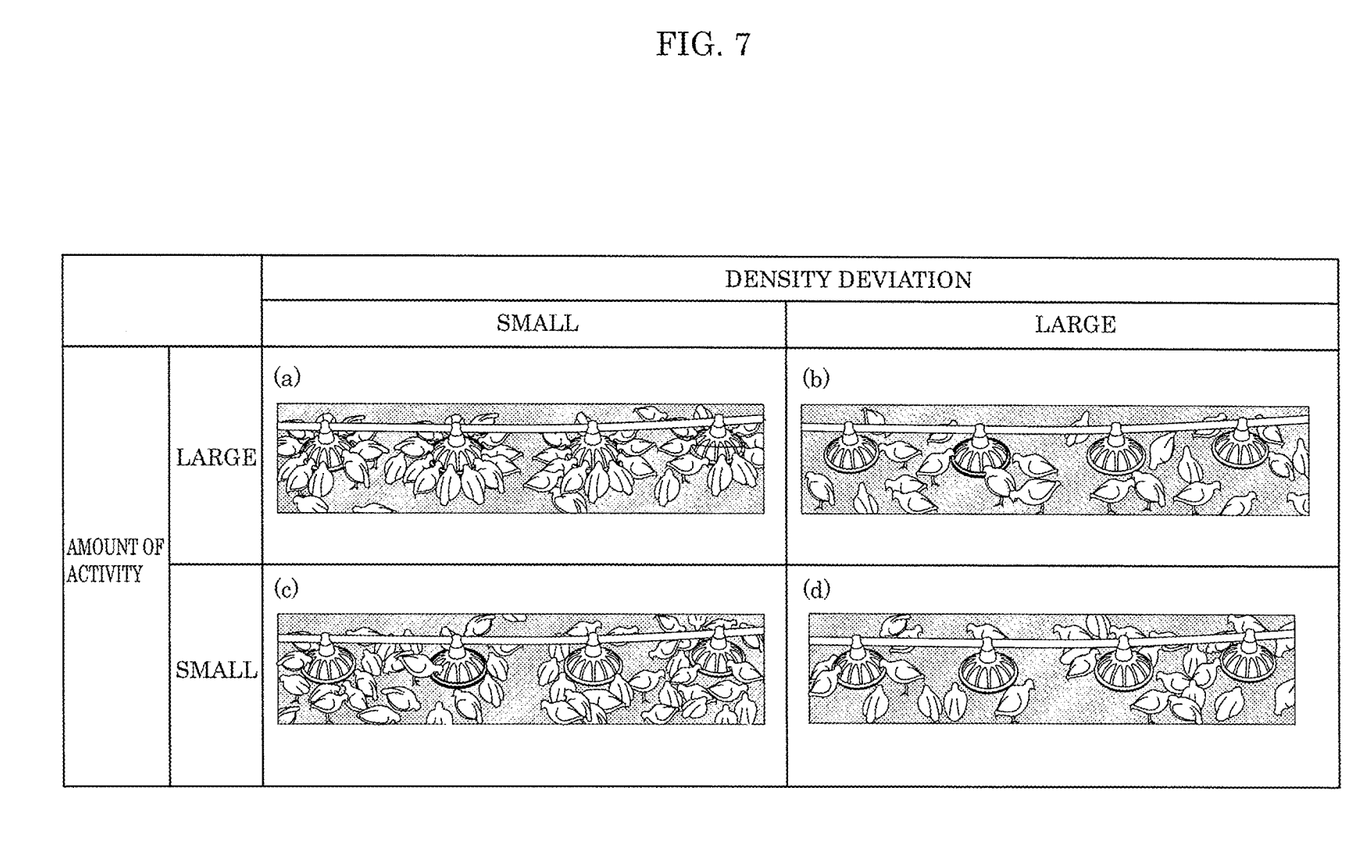
FIG. 7 is a diagram illustrating various states of chickens in the poultry house.

As has been described above, if monitoring unit 32 regularly or periodically monitors the density deviation of chickens and the amount of activity of the chickens, poultry raising system 10 can estimate the state of feed consumed by the chickens in poultry house 100. FIG. 7 is a diagram illustrating various states of the chickens in poultry house 100.

As illustrated in (a) of FIG. 7, when chickens are uniformly distributed around feeder 50 and are active, the feed consumption state is favorable. In this case, the density deviation is small, and the amount of activity is large.

As illustrated in (b) of FIG. 7, when chickens are scatteringly moving around feeder 50, the feed consumption state is not so favorable. In this case, the density deviation is large, and the amount of activity is large.

As illustrated in (c) of FIG. 7, when a certain number of chickens are crowding around feeder 50, but many of the chickens are sleeping, the feed consumption state is not so favorable. In this case, the density deviation is small, and the amount of activity is small.

As illustrated in (d) of FIG. 7, when chickens are not around feeder 50, and are scattered and sleeping inside poultry house 100, the feed consumption state is unfavorable. In this case, the density deviation is large, and the amount of activity is small.

Figure 8:
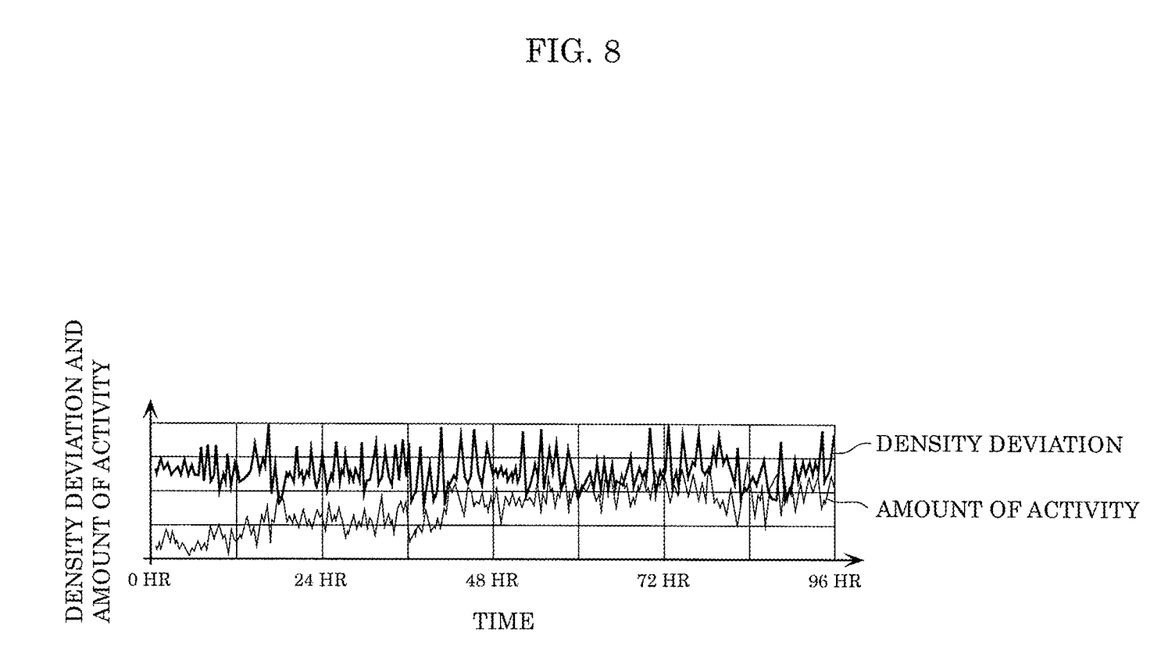
FIG. 8 is a diagram illustrating a time variation of a density deviation and an amount of activity.

As has been described above, if monitoring unit 32 regularly or periodically monitors the density deviation of chickens and the amount of activity of the chickens, poultry raising system 10 can estimate the state of feed consumed by the chickens in poultry house 100. A time variation of a density deviation and an amount of activity monitored by monitoring unit 32 are as illustrated in FIG. 8, for example. FIG. 8 is a diagram illustrating the time variation of a density deviation and an amount of activity. Note that monitoring unit 32 may monitor the moving average of the density deviation, and the moving average of the amount of activity.

[Variation 1]

Figure 9:
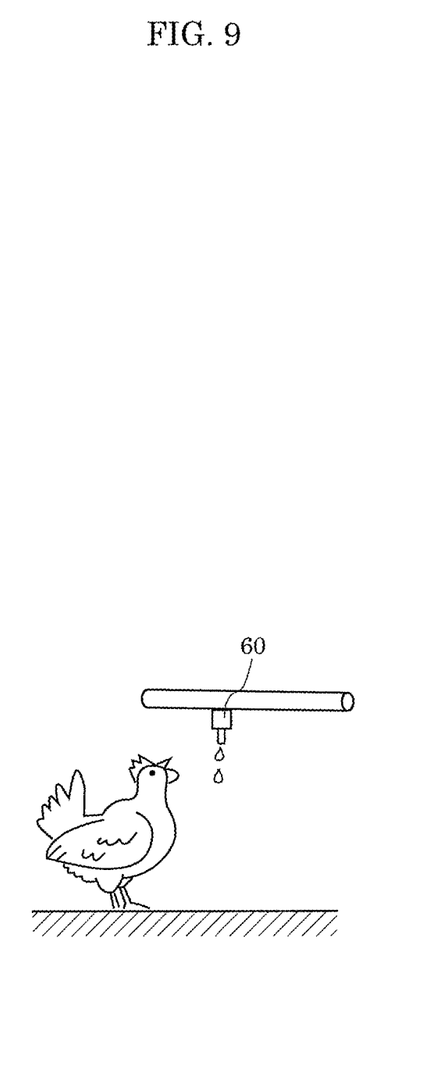
FIG. 9 is a diagram schematically illustrating a waterer.

Although a region around feeder 50 is selectively determined to be a particular region in the aforementioned embodiment, a region around waterer 60 as illustrated in FIG. 9 may be selectively determined to be a particular region. FIG. 9 is a diagram schematically illustrating waterer 60. That is, the particular region is part of an image captured by imaging unit 21, and includes a portion in which at least one of feeder 50 and waterer 60 is present.

In addition, like feeder 50, waterer 60 may have coloration which is more likely to be black when the image is converted into a binary image. That is, waterer 60 may have coloration different from chickens.

In addition, it is not essential for the particular region to include a portion in which at least one of feeder 50 and waterer 60 is present. For example, when an anomaly inside of poultry house 100 is determined based on the crowding state of chickens in poultry house 100, the particular region need not include a portion in which feeder 50 and waterer 60 are present.

[Variation 2]

Figure 10:
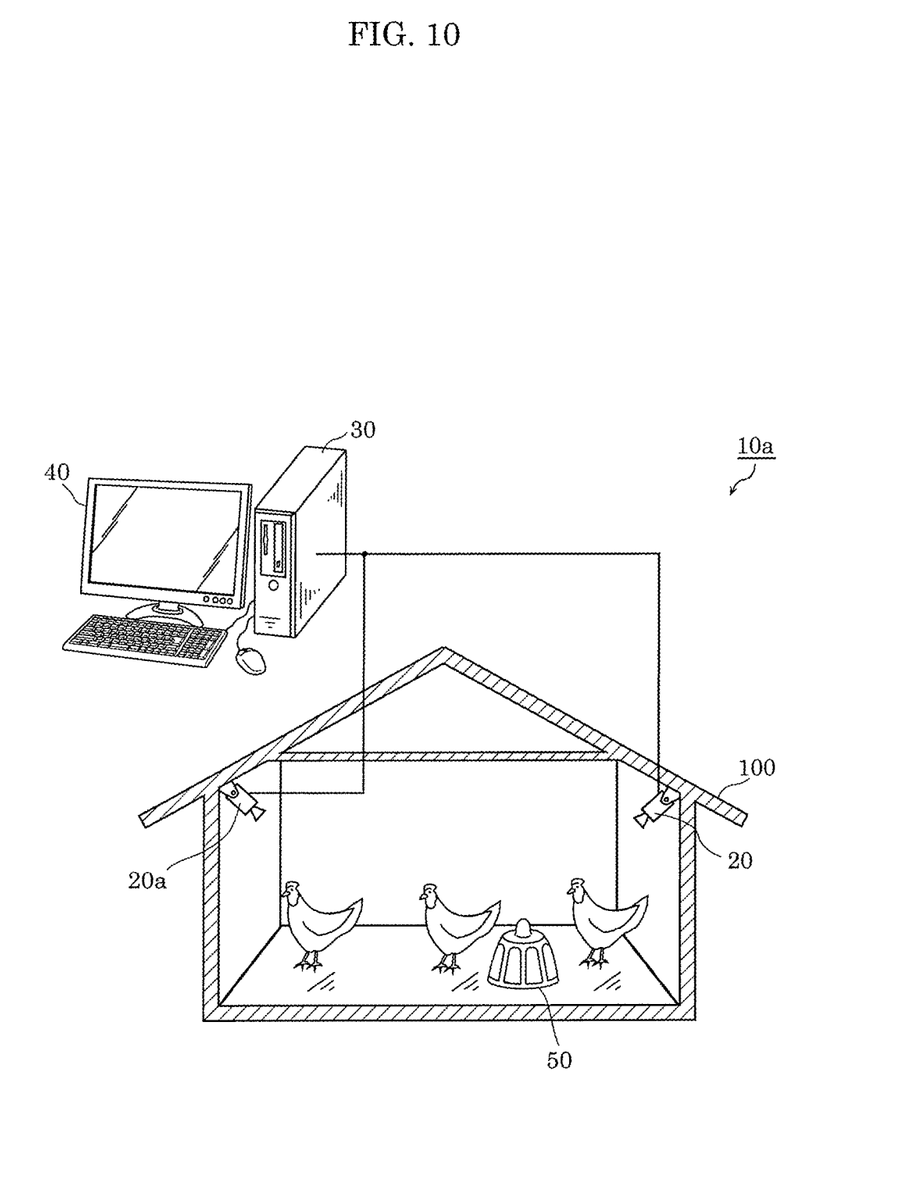
FIG. 10 is a diagram schematically illustrating a poultry raising system which includes a plurality of imaging devices.

Poultry house 100 may include a plurality of imaging devices 20. FIG. 10 is a diagram schematically illustrating such a poultry raising system.

Poultry raising system 10a illustrated in FIG. 10 includes two imaging devices, imaging device 20 and imaging device 20a. That is, poultry raising system 10a includes a plurality of imaging devices. In such poultry raising system 10a, the aforementioned first monitoring operation and the aforementioned second monitoring operation are performed using, for example, an image captured by imaging device 20 and an image captured by imaging device 20a. Compared to poultry raising system 10, poultry raising system 10a can extend the area of monitoring inside of poultry house 100.

[Advantageous Effects, Etc.]

As has been described above, poultry raising system 10 includes: imaging unit 21 which captures an image of an inside of poultry house 100; and monitoring unit 32 which determines a variation in density of chickens present in a particular region in the image captured by imaging unit 21, and monitors the variation determined. The particular region is at least part of the image.

Such poultry raising system 10 can monitor the crowding state of chickens in poultry house 100.

In addition, for example, monitoring unit 32 calculates, for each of unit areas obtained by dividing the particular region, a proportion of the unit area estimated to be occupied by at least one of the chickens, and monitors a variation in the proportions calculated for the unit areas.

Such poultry raising system 10 can monitor the crowding state of chickens in poultry house 100.

In addition, for example, the particular region is part of the image, and includes a portion in which at least one of feeder 50 and waterer 60 is present.

Such poultry raising system 10 can monitor the crowding state of chickens in the region around feeder 50 and waterer 60 as the state of feed consumed by the chickens.

In addition, for example, poultry raising system 10 further includes a notifying unit which provides a notification when the variation monitored by monitoring unit 32 exceeds a threshold. The notifying unit is, for example, display unit 41 which provides a notification by displaying an image.

Such poultry raising system 10 can notify, for example, a manager of poultry house 100 of the increase in the density deviation of chickens in poultry house 100.

In addition, for example, monitoring unit 32 converts the image into a black-and-white image, and calculates, for each of the unit areas, a proportion of the unit area that is white as the proportion of the unit area that is estimated to be occupied by at least one of the chickens.

Such poultry raising system 10 can calculate the density deviation by treating a portion that is white in the black-and-white image as the portion in which at least one of the chickens is present.

In addition, for example, monitoring unit 32 further calculates an amount of activity of at least one of the chickens in the particular region by performing image processing using the image captured by imaging unit 21, and monitors the amount of activity calculated.

Such poultry raising system 10 can monitor the amount of activity of at least one of chickens in poultry house 100.

In addition, for example, poultry raising system 10 further includes a notifying unit which provides a notification when the amount of activity monitored by monitoring unit 32 falls below a threshold. The notifying unit is, for example, display unit 41 which provides a notification by displaying an image.

Such poultry raising system 10 can notify, for example, a manager of poultry house 100 that the amount of activity of chickens in poultry house 100 has decreased.

In addition, for example, monitoring unit 32 converts the image into a black-and-white image, and calculates the amount of activity based on the number of pixels whose color have changed from an image one frame prior. The pixels are included in the particular region in the black-and-white image.

Such poultry raising system 10 can calculate the amount of activity based on a change in the color of the pixels included in the black-and-white image.

In addition, for example, at least one of feeder 50 and waterer 60 has coloration different from the chickens.

Accordingly, if feeder 50 and waterer 60 take on coloration distinguishable from chickens in a binary image, the accuracy of determining the crowding state can be improved.

In addition, for example, poultry raising system 10a includes a plurality of imaging units 21.

Such poultry raising system 10a can extend the area of monitoring inside of poultry house 100.

Other Embodiment

The above has described the poultry raising system according to the embodiments, yet the present invention is not limited to the above embodiments.

For example, the present invention may be realized as a system targeted for diurnal poultry. Other than chickens, the diurnal poultry includes, for example, ducks, turkeys, or guinea fowls.

In addition, in the above embodiments, the poultry raising system is realized as a system that includes a plurality of devices; however, the poultry raising system may be realized as a single device or as a client-server system.

In addition, the assignments of structural elements included in the poultry raising system to the plurality of devices are an example. For example, a structural element included in a device may be included in another device. For example, an information terminal may include a display unit instead of a display device including the display device, and the display device may be omitted.

In addition, these comprehensive or concrete embodiments may be realized by a device, a system, a method, an integrated circuit, a computer program, or a computer-readable recording medium such as a CD-ROM, or by any combination thereof. For example, the present invention may be realized as a poultry raising method, a program for causing a computer to execute the poultry raising method, and a non-transitory recording medium on which the program is recorded.

In addition, in the above embodiment, processing which is performed by a specific processing unit may be performed by another processing unit. Furthermore, the order of a plurality of processing performed for the operations of the poultry raising system described in the above embodiments is an example. The order of the plurality of processing may be changed or performed in parallel.

In addition, in the above embodiments, the structural elements, such as the monitoring unit, may be realized by executing a software program suitable for each structural element. Each structural element may be realized by means of a program executing unit, such as a CPU or a processor, reading and executing a software program recorded on a recording medium such as a hard disk or a semiconductor memory.

In addition, each structural element, such as the monitoring unit, may be realized by a hardware product. Specifically, each structural element, such as the monitoring unit, may be realized by a circuit or an integrated circuit. These circuits may constitute a single circuit as a whole or may be individual circuits. Furthermore, each circuit may be a general-purpose circuit or may be a dedicated circuit.

The present invention also encompasses: embodiments achieved by applying various modifications conceivable to those skilled in the art to each embodiment; and embodiments achieved by optionally combining the structural elements and the functions of each embodiment without departing from the essence of the present invention.

REFERENCE MARKS IN THE DRAWINGS 10, 10a poultry raising system
20, 20a imaging device
21 imaging unit
32 monitoring unit
41 display unit
50 feeder
60 waterer
100 poultry house

The invention claimed is:

1. A poultry raising system, comprising:
an imaging unit configured to capture an image of an inside of a poultry house; and
a monitoring unit configured to determine, by performing image processing on the image, a variation in density of chickens present in a particular region in the image captured by the imaging unit, and monitor the variation determined, the particular region being at least part of the image, the variation comprising a spatial and statistical variation in the particular region,
wherein the density indicates a crowding state of the chickens present in the particular region in the image.

2. The poultry raising system according to claim 1, wherein
the monitoring unit is configured to:
calculate, for each of unit areas obtained by dividing the particular region, a proportion of the unit area estimated to be occupied by at least one of the chickens; and
monitor a variation in the proportions calculated for the unit areas.

3. The poultry raising system according to claim 1, wherein
the particular region is part of the image, and includes a portion in which at least one of a feeder and a waterer is present.

4. The poultry raising system according claim 1, further comprising:
a notifying unit configured to provide a notification about a feed consumption state of the chickens when the variation monitored by the monitoring unit exceeds a threshold.

5. The poultry raising system according to claim 2, wherein
the monitoring unit is configured to:
convert the image into a black-and-white image; and
calculate, for each of the unit areas, a proportion of the unit area that is white as the proportion of the unit area estimated to be occupied by at least one of the chickens.

6. The poultry raising system according to claim 1, wherein
the monitoring unit is further configured to:
calculate an amount of activity of at least one of the chickens in the particular region by performing image processing using the image captured by the imaging unit; and
monitor the amount of activity calculated.

7. The poultry raising system according to claim 6, further comprising:
a notifying unit configured to provide a notification about a feed consumption state of the chicken when the amount of activity monitored by the monitoring unit falls below a threshold.

8. The poultry raising system according to claim 6, wherein
the monitoring unit is configured to:
convert the image into a black-and-white image; and
calculate the amount of activity based on a total number of pixels whose color have changed from an image one frame prior, the pixels being included in the particular region in the black-and-white image.

9. The poultry raising system according to claim 3, wherein
the at least one of the feeder and the waterer has coloration different from the chickens.

10. The poultry raising system according to claim 1, wherein
the imaging unit comprises a plurality of imaging units.

11. A poultry raising method, comprising:
capturing an image of an inside of a poultry house;
determining, by performing image processing on the image, a variation in density of chickens present in a particular region in the image captured, the particular region being at least part of the image; and
monitoring the variation determined, wherein:
the variation comprises a spatial and statistical variation in the particular region, and
the density indicates a crowding state of the chickens present in the particular region in the image.

12. The poultry raising method according to claim 11, further comprising:
calculating, for each of unit areas obtained by dividing the particular region in the image, a proportion of the unit area estimated to be occupied by at least one of the chickens; and
monitoring a variation in the proportions calculated for the unit areas.

13. A non-transitory computer-readable recording medium for use in a computer, the recording medium having a computer program recorded thereon for causing the computer to execute the poultry raising method according to claim 11.

14. The poultry raising system according to claim 1, wherein the statistical variation comprises a standard deviation.

15. The poultry raising method according to claim 11, wherein the statistical variation comprises a standard deviation.

* * * * *